(12) United States Patent
Mandayam Comar et al.

(10) Patent No.: US 11,494,686 B1
(45) Date of Patent: Nov. 8, 2022

(54) ARTIFICIAL INTELLIGENCE SYSTEM FOR RELEVANCE ANALYSIS OF DATA STREAM ITEMS USING SIMILARITY GROUPS AND ATTRIBUTES

(71) Applicant: Amazon Technologies, Inc., Seattle, WA (US)

(72) Inventors: Prakash Mandayam Comar, Bangalore (IN); Anirban Majumder, Bangalore (IN); Srinivasan Hanumantha Rao Sengamedu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1185 days.

(21) Appl. No.: 15/618,519

(22) Filed: Jun. 9, 2017

(51) Int. Cl.
| | | |
|---|---|---|
| *G06F 15/18* | (2006.01) | |
| *G06N 20/00* | (2019.01) | |
| *G06N 5/04* | (2006.01) | |
| *G06N 3/00* | (2006.01) | |
| *G06Q 30/02* | (2012.01) | |

(52) U.S. Cl.
CPC ............ *G06N 20/00* (2019.01); *G06N 3/006* (2013.01); *G06N 5/04* (2013.01); *G06Q 30/0201* (2013.01)

(58) Field of Classification Search
CPC ............... G06Q 30/02; G06Q 30/0241; G06Q 30/0247; G06Q 30/0256; G06Q 10/06393; G06Q 10/10; G06Q 30/0202; G06Q 30/0242; G06Q 30/0243; G06Q 30/0244; G06Q 30/0251; G06Q 30/0255; G06Q 30/0257; G06Q 30/0261; G06Q 30/0263; G06Q 30/0269; G06Q 30/0271; G06Q 30/0273; G06Q 30/0275; G06Q 30/0601; G06Q 30/08; G06Q 40/04; H01L 27/1108; Y10S 257/903; G06F 16/374; G06F 16/951; G06F 40/30
See application file for complete search history.

(56) References Cited

U.S. PATENT DOCUMENTS

| | | | |
|---|---|---|---|
| 6,379,251 B1 | 4/2002 | Auxier et al. | |
| 9,367,524 B1 * | 6/2016 | Filev | ................. G06Q 30/0277 |
| 10,176,429 B2 * | 1/2019 | Goswami | ............... G06F 17/00 |

(Continued)

OTHER PUBLICATIONS

Craswell, et al., "An Experimental Comparison of Click Position-Bias Models," WSDM'08, Feb. 11-12, 2008, Palo Alto, California, USA. Copyright 2008 ACM 978-1-59593-927-9/08/0002, pp. 1-8.

(Continued)

*Primary Examiner* — Luis A Sitiriche
(74) *Attorney, Agent, or Firm* — Robert C. Kowert; Kowert, Hood, Munyon, Rankin & Goetzel, P.C.

(57) ABSTRACT

At an artificial intelligence-based service, an indication of a similarity group of items of a data stream is obtained. A subset of the stream items is to be included in an ordered collection and presented via an interface which allows one or more types of interactions. Using a first data set which includes interaction records of items in the similarity group, one or more machine learning models are trained to predict (Continued)

a relevance metric associated with a particular type of interaction. A predicted value of the relevance metric is obtained from a trained version of a model and stored.

20 Claims, 10 Drawing Sheets

(56) References Cited

U.S. PATENT DOCUMENTS

| | | | |
|---|---|---|---|
| 2005/0256756 A1* | 11/2005 | Lam | G06Q 30/0202 705/7.33 |
| 2006/0095281 A1 | 5/2006 | Chickering et al. | |
| 2007/0027743 A1 | 2/2007 | Carson et al. | |
| 2007/0118546 A1* | 5/2007 | Acharya | G06F 16/9535 707/999.101 |
| 2010/0017262 A1 | 1/2010 | Iyer et al. | |
| 2012/0124192 A1* | 5/2012 | Daoud | G06F 16/24575 709/224 |
| 2012/0303792 A1* | 11/2012 | Sathish | G06F 16/9535 709/224 |
| 2014/0358826 A1* | 12/2014 | Traupman | G06Q 50/01 706/11 |
| 2016/0110646 A1* | 4/2016 | Somekh | G06N 5/04 706/46 |
| 2016/0224561 A1* | 8/2016 | Agarwal | G06Q 50/01 |
| 2017/0061286 A1* | 3/2017 | Kumar | G06Q 30/0269 |
| 2017/0228695 A1* | 8/2017 | Agrawal | G06Q 10/1053 |
| 2017/0352350 A1* | 12/2017 | Booker | G06F 16/3344 |
| 2018/0039910 A1* | 2/2018 | Hari Haran | G06N 5/022 |
| 2018/0218430 A1* | 8/2018 | Prendki | G06Q 30/0631 |

OTHER PUBLICATIONS

Chapelle, et al., "A Dynamic Bayesian Network Click Model for Web Search Ranking," WWW 2009, Apr. 20-24, 2009, Madrid, Spain. ACM 978-1-60558-487-4/09/04. pp. 1-10.

Chen, et al. "Position-Normalized Click Prediction in Search Advertising," KDD'12, Aug. 12-16, 2012, Beijing, China. Copyright 2012 ACM 978-1-4503-1462-6/12/08. pp. 1-9.

Dupret, et al., "A User Browsing Model to Predict Search Engine Click Data from Past Observations," SIGIR'08, Jul. 20-24, 2008, Singapore. Copyright 2008 ACM 978-1-60558-164-4/08/07, pp. 1-8.

Granka, et al., "Eye-Tracking Analysis of User Behavior in WWW Search," SIGIR '04, Jul. 25-29, 2004, Sheffield, South Yorkshire, UK. Copyright 2004 ACM 1-58113-881-4/04/0007, pp. 1-3.

Joachims., et al., "Accurately Interpreting Clickthrough Data as Implicit Feedback," SIGIR'05, Aug. 15-19, 2005, Salvador, Brazil. Copyright 2005 ACM 1-59593-034-5/05/0008, pp. 1-8.

Richardson, et al., "Predicting Clicks: Estimating the Click-Through Rate for New Ads," WWW 2007, May 8-12, 2007, Banff, Alberta, Canada. ACM 978-1-59593-654-7/07/0005, pp. 1-9.

Agichtein, et al., "Improving Web Search Ranking by Incorporating User Behavior Information," SIGIR'06, Aug. 6-11, 2006, Seattle, Washington, USA. Copyright 2006 ACM 1-59593-369-7/06/0008, pp. 1-8.

* cited by examiner

US 11,494,686 B1

ARTIFICIAL INTELLIGENCE SYSTEM FOR RELEVANCE ANALYSIS OF DATA STREAM ITEMS USING SIMILARITY GROUPS AND ATTRIBUTES

BACKGROUND

Over recent years, significant portions of business operations, including the retailing of items belonging to numerous product categories, have been migrated to e-commerce environments. E-retail operations now provide easy access and purchasing capabilities to consumers located throughout the world via their web sites. Furthermore, as more and more consumers access news and perform social interactions via electronic devices such as smart phones and the like, information about items that may potentially be of interest to the consumers is often provided electronically. In some cases information about such items may be indicated via advertisements displayed, for example, together with results provided by search engines, or within the interfaces of various frequently-accessed applications such as social media applications or e-mail applications.

Some organizations may be responsible for stocking and selling very large inventories, where the statistical properties of the demands for individual items within the inventory may vary. To stimulate demand for various subsets of inventory items, promotions of various types (e.g., limited-duration sales and the like) may be undertaken from time to time. Information about such promotions may also be conveyed to potential consumers via electronic interfaces in many cases, such as via a "current deals" web page of an e-retailing web site. In an extremely competitive business environment, where potential consumers interact with a number of different electronic applications vying for their attention, and often do not have much time to spend on any given electronic interaction, the manner in which promotion-related product information is conveyed to the potential consumers may have a significant impact on the success of the promotions.

The extent to which potential customers initiate fruitful electronic interactions from the perspective of such organizations, such as click-through rates on web links that eventually lead to a purchase of an item, has become an important business metric for the organizations. Unfortunately, estimating the level of interest or relevance of displayed item information, especially if the information is displayed for relatively short time periods, is not a straightforward exercise. Determining how best to arrange item information in order to optimize relevance metrics for various types of interactive interfaces remains a non-trivial technical challenge.

Figure 1:
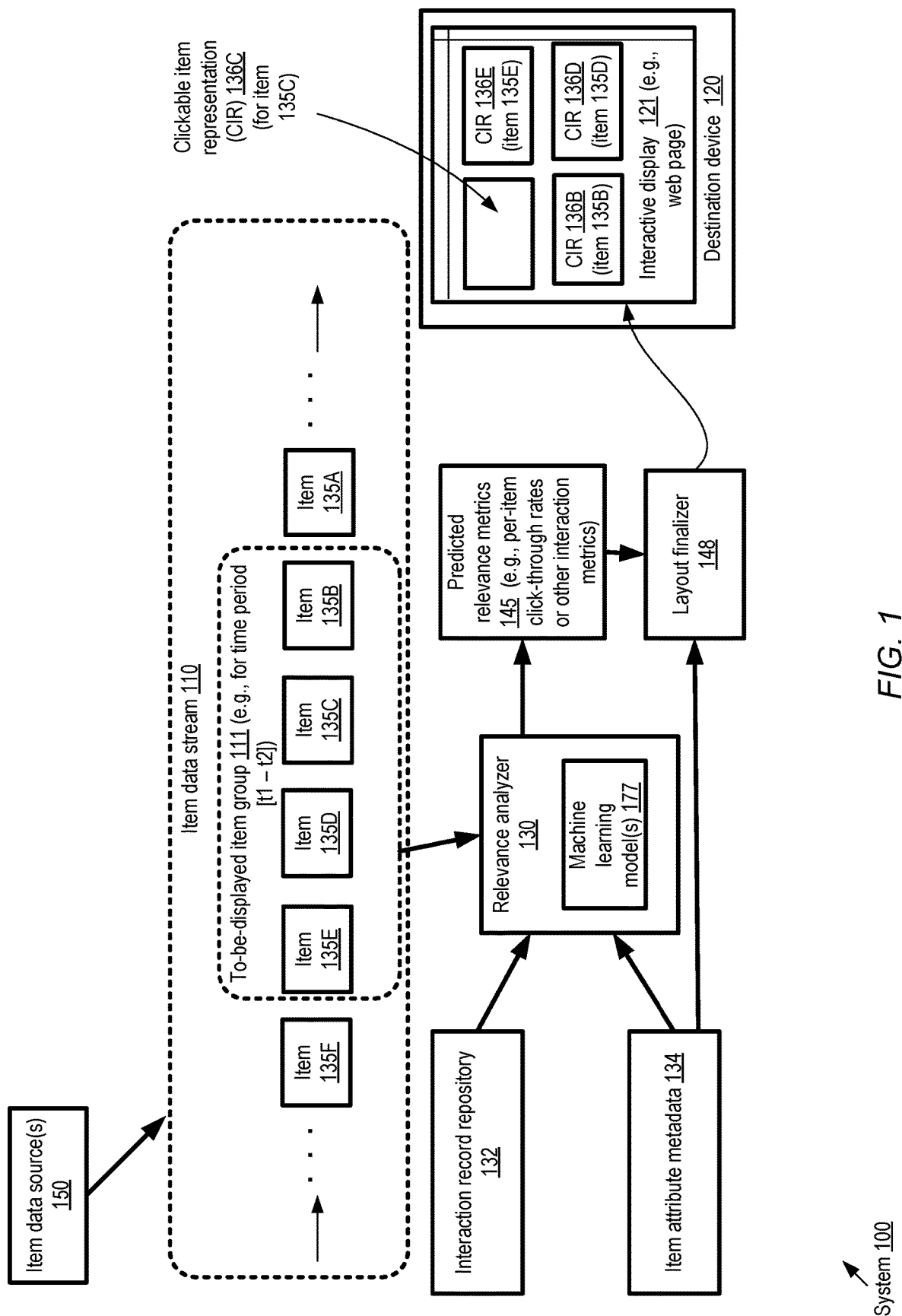
FIG. 1 illustrates an example system environment in which artificial intelligence techniques employing machine learning models may be utilized for relevance analysis of items of a data stream, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for using machine learning to perform relevance analysis with respect to items of a data stream are described. In various embodiments, one of the high-level goals of a system at which such relevance analysis methods are employed may be to provide guidance for arranging information about a dynamically changing set of items within a programmatically generated interactive interface (e.g., a web page or list with clickable links) so as to optimize a desired metric associated with interactions initiated using that interface (e.g., to maximize the revenue eventually generated as a result of viewers clicking on links representing the items). The rate at which a given set of target entities (such as potential viewers of the web page, at least some of whom may be potential buyers of an item shown on the web page) initiate interactions with the representation of a given item (such as clicking on a web link associated with the given item) may represent the level of interest or relevance of the given item. The prediction or estimation of relevance metrics based on interaction rates may constitute an important goal of an analytics system or service employed in various embodiments. Relevance metrics may also be referred to in various embodiments as interaction metrics. In some embodiments in which the interactive interface being used comprises a web page, click-through rates (the ratio of the number of clicks on a link representing an item on the web page, to the total number of impressions or views of the web page) may represent one example of an interaction metric.

In at least some embodiments, the observed rate of interactions with a given item may depend at least in part on the relative positioning or placement of the item within the interactive interface—e.g., web links placed near the top of a web page or list of links may typically be clicked on more often than web links placed near the bottom of the web page or list of links. In various embodiments, as discussed below in further detail, the task of predicting true interaction rates for items may include estimating factors which represent such position-dependent biases, as well as estimating the conditional interaction rates for items once the items are placed at a particular position. A predicted relevance metric may be used as one of the factors (e.g., in a set of factors which may include price, duration of a promotion and the like) used to select the position at which the item should be displayed or included within the interface in various embodiments, e.g., to optimize the overall revenue resulting from the use of the interactive interface.

Algorithms for predicting relevance metrics or interaction metrics such as click-through rates with respect to web links may be implemented at a relevance analyzer comprising one or more computing devices in some embodiments. In at least one embodiment, a relevance analyzer may be implemented at a network-accessible service as discussed below in further detail. In other embodiments a relevance analyzer may be implemented as a standalone tool which may not necessarily require or utilize resources of a network-accessible service. In one example scenario, the layout of a web page comprising a display of items that are on sale during a particular time window, with corresponding web links that when clicked lead towards a details page or a purchase page for the item, may have to be arranged with the help of a relevance analyzer. In other example scenarios, other types of programmatically generated interactive interfaces may be used, such as voice-driven interfaces, gesture-driven interfaces and the like; at least some of the machine learning-based techniques for relevance analysis described herein may be applied with equal success regardless of the details of the interface used in various embodiments.

According to one embodiment, a data stream or sequence of notifications regarding numerous items, some number of which are to be selected for inclusion for some specified time period within an interactive interface, may be received. The selection and arrangement of items for inclusion in the interface may be part of a long-term activity in some embodiments, e.g., such an activity may continue for days, weeks or months, with items being added to the data stream after random or deterministic intervals comprising a few hours, minutes or seconds. With respect to items which have already been selected for inclusion in the interface, interaction records may be collected and retained for at least some retention periods in various embodiments. Such records may indicate, for example, how often interactions of various types were initiated during a given time period in which a given item was included in the interface at a particular position relative to other items. In addition to the information about the interactions which occurred, in at least some embodiments data about various attributes of individual items (e.g., price, product category, etc.) may also be available as input for relevance analysis.

In some embodiments, some or many of the items of a stream may be "new" in that they may not have been present in the stream earlier. In general, in at least some embodiments, the duration for which a representation of a given item remains in the interface may be quite short. As such, when an interaction rate which is to be used to decide where to position a given item within the interface is to be estimated, in many cases no (or very few) historical interaction records pertaining to the item itself may be available in at least some embodiments. This problem of sparsity of historical data may be referred to as a "cold start" problem in various embodiments.

The attribute information about the items which have appeared earlier in the stream, as well as the associated historical interaction records, may be utilized to help predict or estimate interaction rates for new items (or for items for which limited historical interaction records are available) in various embodiments. According to one embodiment, a similarity group of items with respect to a given item of a data stream may be identified. The similarity group, as implied by its name, may comprise one or more other items of the data stream which have at least some characteristics similar to, or in common with, the given item for which a relevance metric is to be estimated. In some embodiments, a similarity group may be identified by the relevance analyzer itself, e.g., by comparing attribute metadata of the given item and other items for which records are available. In other embodiments, a separate similarity analysis system or service may be used, which may for example determine similarity scores for various pairs of items using a larger set of attributes than are accessible to the relevance analyzer.

Using the similarity group and the historical interaction records of items which are members of the similarity group with respect to a given item, one or more machine learning models may be trained in various embodiments to predict one or more metrics of one or more targeted types of interaction with the given item. The metric may, for example, be based at least in part on a learned position bias factor indicative of an impact of item positioning within the interactive interface to be used (such as a display). In some embodiments, a two-stage machine learning approach may be used, in which position bias factors are learned in a first state and an attribute-based regression model is used in the second stage; in other embodiments, a single consolidated model may be used. In some embodiments, the distribution of a targeted type of interaction with an item in a given position within a collection of items in the interface may be modeled as a Poisson distribution. Details of the mathematical framework and logic of the machine learning techniques which may be used in various embodiments are provided below.

After the one or more models have been trained, they may be employed to determine relevance metrics corresponding to other items as they arrive in the stream, and the metrics may be used to select a particular position at which a given item should be included within the interactive interface in various embodiments. In some embodiments, after the position for a particular item has been selected using a trained machine learning model, programmatic instructions to cause a representation of the particular item to be included at a particular position within the interface may be transmitted to one or more devices at which the interface is implemented. For example, programmatic instructions indicating the layout of a web page may be transmitted to a device such as a laptop, smart phone, desktop or the like at which a web browser used for web interactions is running.

As mentioned earlier, in some embodiments the relevance metric being estimated or predicted using the machine learning model may comprise a click-through rate. In other embodiments, other interaction-related metrics may be estimated, such as a purchase rate, a revenue accrual rate or other revenue-related rates. The data set used to train the machine learning model or models may comprise values for various attributes in different embodiments, such as product category of an item, price, customer reviews, and the like.

Modeling Notation and Formulation of Machine Learning Approaches

Some of the concepts associated with the machine learning techniques used in various embodiments are introduced here using click-through rates (CTRs) on a web page displaying a collection of item representations for some time period as an example relevance or interaction metric. As mentioned earlier and also discussed below in the context of FIG. 8, programmatically generated interactive interfaces other than web pages may be used in different embodiments, and other types of relevance or interaction metrics may be predicted or estimated using similar techniques in some embodiments.

Let $I=\{i_1, i_2, \ldots, i_N\}$ denote a collection of N items with respect to which relevance analysis is to be performed, and let $X=\{x_1, x_2, \ldots x_N\}$ denote a corresponding set of feature vectors (e.g., attribute values, or features derived from attribute values) associated with the N items. From the set I, a subset $A_t$ of items may be eligible for inclusion in a listing or collection of items within a web page at a time t, with different subsets being eligible at different times. The web page is assumed to have P ordered positions to display respective items. In one simple example scenario, a grid of 12 item icons may be fit on the page in a grid consisting of 4 rows of 3 item icons each, and the positions may be represented using the (row, column) notation with values (1,1), (1,2), (1,3), (2,1), (2,2), (2,3), (3,1), (3,2), (3,3), (4,1), (4,2), (4,3), with (1,1) representing the leftmost column of the top row, and (4,3) representing the rightmost column of the bottom or fourth row. It is noted that in at least some embodiments, once a position of an item is selected, that item may remain in that position within the web page for as long as the item is shown on the web page. In other embodiments, the position of a given item within the web page may be modified during the time period that the item is displayed in the page, e.g., as other items' lifetimes or eligibility periods expire.

Assume that the goal of the relevance analysis is to rank the items of $A_t$ for positioning within the web page so as to maximize click through rates (CTRs). Let $I_{ip}$ denote the total number of impressions (e.g., views by users who might click on the item) for an item i placed at position p, and let $C_{ip}$ denote the total number of clicks for an item i placed at position p. The observed click-through rate CTR(i) for an item i may be given by:

$$CTR(i) = \frac{\sum_p C_{ip}}{\sum_p I_{ip}} \quad \text{Equation (1)}$$

In at least some embodiments, to take the effect of positioning of the item within the web page, the probability (P(click=1|i,p) of a click on an item i at a position p may be formulated as the product of two factors:

$$P(\text{click}=1|i,p) = \beta_p * \alpha_i \quad \text{Equation (2):}$$

In equation 2, $\beta_p$ represents the probability of examining the item representation at position p by a viewer or user, while $\alpha_i$ represents the probability of clicking on the item's link if the item is examined. In various embodiment, $\beta_p$ may be referred to as a position bias factor, which represents the impact of item positioning within an interactive interface such as the web page, while $\alpha_i$ may represent CTR(i). Given a sufficient set of historical interaction records $\{I_{ip}, C_{ip}\}$, in some embodiments clicks may first be modeled as a binomial distribution with success probability $\beta_p \alpha_i$ and $I_{ip}$ as the number of trials, $C_{ip} \sim \text{Binomial}(I_{ip}, \beta_p \alpha_i)$. Next, the binomial distribution may be approximated as a Poisson process in some such embodiments, $C_{ip} \sim \text{Poisson}(I_{ip}\beta_p\alpha_i)$ where $I_{ip}\beta_p\alpha_i$ is the average number of clicks accrued by item i from position p. To address click sparsity, a gamma prior may be added over the position bias factor in some implementations. An update equation for $\alpha_i$ and $\beta_p$ that maximizes the data likelihood may be determined and used in a generative machine learning model to estimate the PTR values.

The reliability of the CTR estimates obtained from a Poison-Gamma generative model of the kind outlined above may be affected by the fact that an item may generally remain at a single position within the web page in various embodiments, so information about the impact of placing the item at different positions may not be available from the interaction records available. Accordingly, in at least some embodiments, a different approach which relies on similarity analysis may be used. As mentioned earlier, retained interaction records and associated attribute values may be accessible for a large number of items in at least some embodiments. Among the potentially large set of items for which recorded data is available, collections of items which are similar to each other based on various attribute combinations may be identified and designated as similarity groups or substitute groups in various embodiments. In at least one embodiment, Jaccard similarity metrics between item pair attribute sets may be computed to identify similarity groups. For reasons such as diversity, personalization, geographic factors and the like, items which are similar to one another may typically not be placed adjacent to each other on the web page in various embodiments. As a result, the set of positions occupied by members of a given similarity group may be fairly widely distributed within the web page in such embodiments.

To identify similarity groups, the following approach may be taken in at least some embodiments. A similarity matrix Sim(i,j) may be determined with respect to pairs of items i and j. Individual elements of Sim(i,j) may comprise numerical scores between 0 and 1, where Sim(i,j)=1 indicates that items i and j can be considered substitutes of one another, and Sim(i,j)=0 indicates that items i and j are very different from one another. In some embodiments, a similarity analysis service may provide the similarity matrices, e.g., in response to programmatic requests which specify item identifiers, while in other embodiments the relevance analyzer may compute the similarity matrix itself using available attribute values for the items. In at least one embodiment, if the originally-obtained Sim(i,j) value is less than a selected threshold (where the threshold may be considered a meta-parameter of the relevance analysis), Sim(i,j) may be set to zero. The notation $p^i_j$ may be used to represent the quantity $\text{Sim}(i,j)/\Sigma_j \text{Sim}(i,j)$ in some embodiments. Clearly, $\Sigma_j p^i_j = 1$. For any item i, a similarity group $S_i$ may be identified as the set of items whose similarity scores with respect to i exceed some threshold $\Sigma$: $S_i = \{j: \text{Sim}(i,j) > \tau\}$.

The available interaction records for some selected time period may be analyzed to obtain a set of items which are candidates for similarity group membership with respect to one another. A generative machine learning model that hypothesizes the observed clicks for a similarity group $S_i$ may be represented by the following equation in some embodiments:

$$C'_{ip} = \Sigma_{j \in S_i} p^i_j * C_{jp}, \text{ where } C_{jp} \sim \text{Poisson}(I_{jp}\alpha_i\beta_p) \quad \text{Equation (3):}$$

In Equation 3, $C'_{ip}$ refers to the clicks accrued by elements of the similarity group $S_i$, and may be defined as the convex combination of clicks of items present in the similarity group. Note that the set $S_i$ is never empty as the item i itself is always present in its similarity group $S_i$. Further, note that $C_{jp}$ for item j does not depend on $\alpha_j$, but on $\alpha_i$ factors for the corresponding similarity group. A given item j may be present in multiple similarity groups in at least some embodiments, and may therefore contribute to the CTR estimations for each of the similarity groups. The data likelihood D for the similarity group without any prior term is given by:

$$D = \Pi_{i,p} \Sigma_j p^i_j * ((I_{jp}\alpha_i\beta_p)^{C_{ip}} \exp(-I_{jp}\alpha_i\beta_p)/(C_{ip}!) \quad \text{Equation (4):}$$

The log likelihood L is given by:

$$L = \Sigma_{i,p} \log(\Sigma_j p^i_j * ((I_{jp}\alpha_i\beta_p)^{C_{ip}} \exp(-I_{jp}\alpha_i\beta_p)/(C_{ip}!)) <= \Sigma_{i,p,j} p^i_j * C_{jp} \log(I_{jp}\alpha_i\beta_p) - I_{jp}\alpha_i\beta_p + \text{const.} \quad \text{Equation (5):}$$

The inequality shown in equation (5) follows from Jensen's inequality. The derivative of log likelihood with respect to $\alpha_i$ and $\beta_p$ is given by Equations (6) and (7):

$$\partial L/\partial \beta_p = \Sigma_{i,j} p^i_j * (Cjp/\beta_p - I_{jp}\alpha_i) \quad \text{Equation (6):}$$

$$\partial L/\partial \alpha_i = \Sigma_{j,p} p^i_j * (Cjp/\alpha_i - I_{jp}\beta_p) \quad \text{Equation (7):}$$

The update formula for the model which uses similarity group information is given by:

$$\beta_p = (\Sigma_{i,j} p^i_j C_{jp})/(\Sigma_{i,j} p^i_j I_{jp}\alpha_i) \alpha_i = (\Sigma_{j,p} p^i_j C_{jp})/(\Sigma_{j,p} p^i_j I_{jp}\beta_p) \quad \text{Equation (8):}$$

The $\alpha_i$ values according to the model with the update formula of Equation (8) may be obtained in various embodiments for the items that were part of the data stream in the past, for which recorded interaction data is available. A mechanism to estimate the CTRs or $\alpha_i$ for new, previously unseen items may comprise building a regression model using $f(x_i) \sim \alpha_i$. A constraint (such as $-\lambda \Sigma_{i,j} \text{Sim}(i,j)(\alpha_i - \alpha_j)^2$ may be added to ensure that similar items get similar $\alpha_i$ values in this approach in some embodiments.

The two-stage approach of first utilizing the similarity model to obtain $\alpha_i$ values for past items of the stream using a generative machine learning model, and then building a regression model in the second stage, may have some disadvantages in various embodiments—for example, modeling errors may be accumulated at each of the stages. Accordingly, in at least one embodiment, a single-stage approach may be used, in which $\alpha_i$ are learned directly as functions of the item attributes according to the following formulation:

$$\alpha_i = g(x_i; w) = 1/(1 + \exp(-w^T x_i)) \quad \text{Equation (9):}$$

In the single-stage approach as indicated by Equation (9), similar g(x) values may be obtained for items which are similar to one another, thereby avoiding the need for a second regression stage. Both $\beta_p$ and the weight vector w may be learned together in some embodiments by maximizing the data likelihood using stochastic gradient methods. The gradient with respect to w is given by the chain rule $\partial L/\partial w = (\partial L/\partial \alpha_i) * (\partial \alpha_i/\partial w)$, where $(\partial \alpha_i/\partial w)$ may be obtained by:

$$\partial \alpha_i/\partial w = -w \exp(w^T x_i)/(1 + \exp(-w^T x_i))^2 \quad \text{Equation (10):}$$

The function g(x) is not the same as a logistic regression model in this formulation in that there are no binary response variables in the model. Instead, g(x maps item attributes to values within the unit interval, which may be used as a proxy to the CTR score in various embodiments.

In various embodiments, implementations of each of the models may, for example, include memory for storing input values and parameters and computer-executable instructions for an initial set of computations on the input values. In some embodiments, intermediary layers of the model may include memory storing computer-executable instructions and/or data for manipulating the results of the initial computations and determining values to be transmitted to an output layer. The output layer may in turn include memory and/or computer-executable instructions for generating and/or storing output values such as the scores indicating policy violation probabilities. Any of a number of types of data structures may be used for storing data and/or implementing the algorithm logic, e.g., including data structures optimized for storing matrices, vectors, arrays, hash tables and the like. It is noted that in some embodiments, formulations, equations and/or notation which differs from those provided above may be used to predict relevance metrics or interaction metrics such as CTRs using machine learning for items of a data stream.

Example System Environment

FIG. 1 illustrates an example system environment in which artificial intelligence techniques employing machine learning models may be utilized for relevance analysis of items of a data stream, according to at least some embodiments. As shown, system 100 may comprise a relevance analyzer 130 responsible for generating predicted relevance metrics 145 (such as per-item click-through rates or other interaction metrics) with regard to various items of an item data stream 110. The relevance analyzer may comprise, or be implemented using, one or more computing devices in various embodiments. The data stream 110 may, for example, comprise a sequence of messages issued by one or more item data sources 150 and directed at least in part to the relevance analyzer, with individual ones of the messages indicating one or more items 135 (e.g., 135A-136F, with item 135A preceding item 135B in the stream, item 135B preceding item 135C and so on). A revenue optimization software application responsible for selecting items of an inventory which are to discounted or promoted during a given time interval may represent one example of an item data source 150 in the depicted embodiment. Representations of a selected number of items 135 may be included in an interactive display 121 (e.g., a web page 121) for some selected time periods at various destination devices 120 (such as laptops, smart phones, tablet devices and the like) in the depicted embodiment. For example, to-be-displayed item group 111 may indicate the subset of stream items (135B, 135C, 135D and 135E) whose representations are to be displayed via interactive display 121 during a time interval [t1–t2] in the depicted embodiment.

In at least some embodiments, the relevance analyzer may have access to an interaction record repository 132 and/or a set of item attribute metadata 134 pertaining to various items 135. Based at least in part on the attribute metadata, in some embodiments, similarity groups of items that have been encountered in the stream 110 over some past time period may be generated. In general, as indicated by the name, the sets of attributes or features of the different items included within a given similarity group may be more similar to one another than the sets of attributes or features of items which are not included in the similarity group. Items may be selected for inclusion within a given similarity group based at least in part on metrics such as Jaccard similarity among their attribute values in some embodiments. In one embodiment, similarity scores or matrices (e.g., similar to the Sim(i,j) matrices discussed earlier) may be generated by the relevance analyzer 130 itself. In other embodiments, a separate service which may for example have access to more detailed attribute information than the relevance analyzer 130 may be used to generate similarity groups.

The interaction records stored in repository 132 may contain records of interaction sessions with the interactive displays 121 instantiated at numerous destination devices 120 in the past. For example, a given interaction record may indicate the number of clicks that were directed towards a given clickable item representation (CIR) 136 of an item 135 at a particular position within the display 121, and the number of impressions or times that the web page containing the CIR was viewed.

One or more machine learning models 177 may be trained in the depicted embodiment, e.g., using a data set which comprises attribute-based similarity group membership information and corresponding interaction records, to predict metrics of one or more targeted types of interaction with displayed items (such as click-through rates). In some embodiments, a position bias factor indicative of an impact of item positioning within the interactive interface may also be learned using the machine learning model(s). In one embodiment, the two stage approach discussed above may be used, in which position bias factors are learned first, followed by the use of a regression model corresponding to the position-independent relationship between item attribute values and the interaction metrics. In other embodiments, the single-stage approach discussed above may be employed, in which the position bias factors may be learned together with the weight vectors modeling relationships between item attributes and the interaction metrics, e.g., using a stochastic gradient-based learning algorithm. In some embodiments, the distribution of a targeted type of interaction (such as a click) with an item in a given position within the interactive display may be modeled as a Poisson distribution, as also indicated earlier.

In some embodiments, after the machine learning model or models have been trained and evaluated, they may be executed to obtain predicted relevance metrics 145 for newly-arrived items of the stream 110. A layout finalizer 148, which may consider factors in addition to the predicted relevance metrics themselves, such as revenue potential, seasonality, personalization and the like may be responsible for deciding the positioning of various item representations such as CIRs 136 within the interactive display 121 made visible at a particular destination device 120. For example, with respect to to-be-displayed item group 111, CIRs 136C and 136E representing item 135C and 135E may be positioned in the top row of CIRs in display 121, while CIRs 136B and 136D corresponding to items 135B and 135D may be positioned in the bottom row in the depicted embodiment. The layout finalizer 148 may also utilize attribute metadata pertaining to the items of the to-be-displayed item group 111 in the depicted embodiment when making CIR placement decisions. Records of the interactions which occur with the selected layout of CIRs may be added to repository 132 in the depicted embodiment.

In at least one embodiments, the relevance analyzer 130 may be implemented as part of a network-accessible service, e.g., at a provider network as discussed in further detail below. One or more programmatic interfaces may be implemented by the relevance analyzer in such embodiments. Such programmatic interfaces, which may for example include a set of application programming interfaces (APIs), a web-based console, command-line tools, or graphical user interfaces, may be used to submit requests for relevance or interaction metrics, position bias factors, representations of the stream items, and so on.

Example Machine Learning Alternatives

Figure 2:
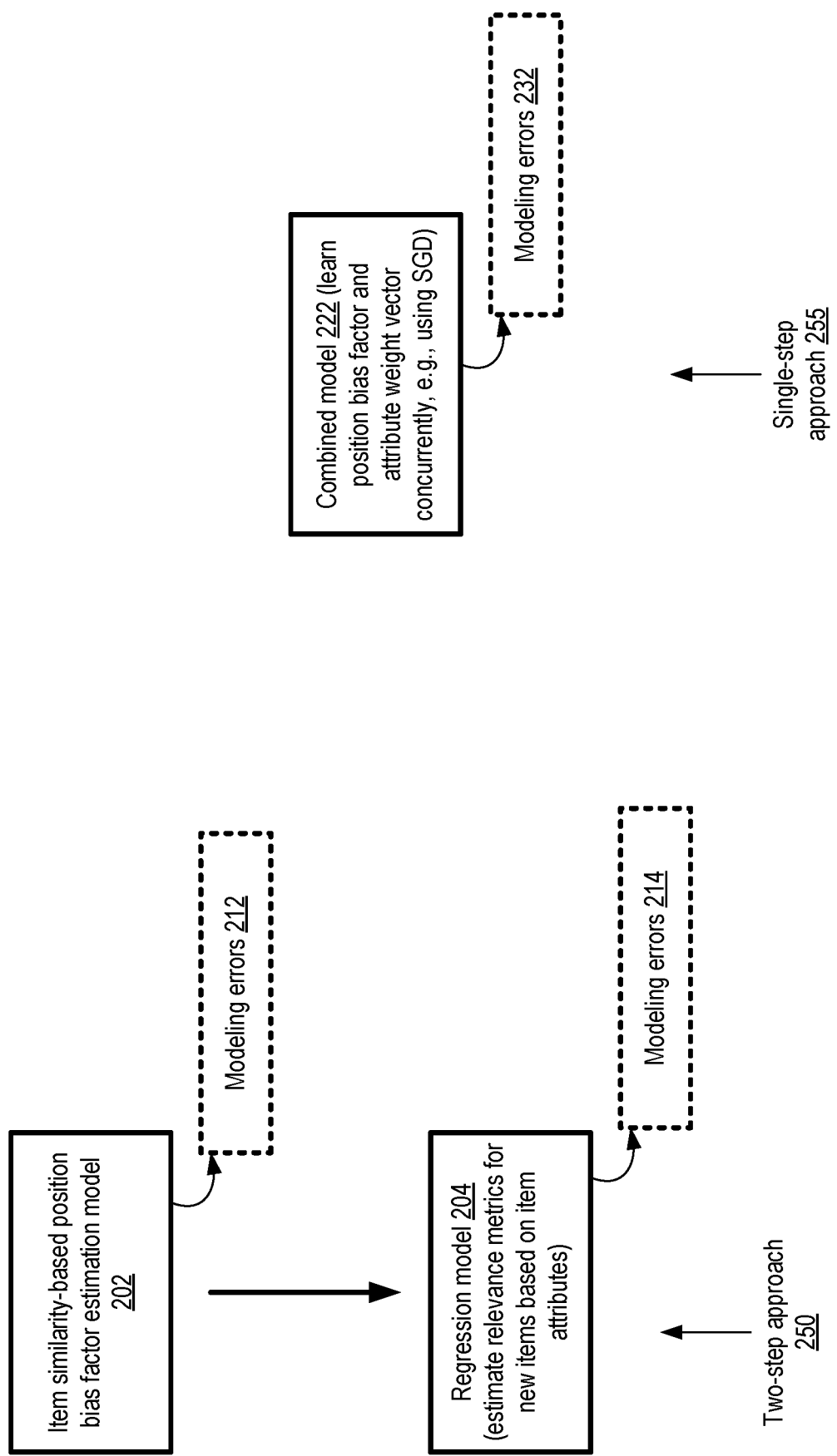
FIG. 2 illustrates a high-level overview of two example machine learning approaches which may be taken to perform relevance analysis for stream items, according to at least some embodiments.

FIG. 2 illustrates a high-level overview of two example machine learning approaches which may be taken to perform relevance analysis for stream items, according to at least some embodiments. In a two-step approach 250, a first model 202 may be trained to estimate position bias factors, e.g., using records of interactions with items of similarity groups as discussed earlier in the context of Equations (4)-(8). Then, having obtained estimates of the position bias factors, in the second phase, a regression model 204 may be trained to predict relevance metrics using attribute values of the items as part of the training set. As indicated in the discussion with respect to regression model $f(x_i)$, a constraint may be added to the model to ensure that items which are similar to each other have similar predicted relevance metrics in at least some embodiments. In each phase of the two-phase approach, respective sets of modeling errors (e.g., errors 212 and 214) may occur in various embodiments, as is the case with modeling efforts in general. As a result, the overall modeling error associated with the task of predicting or estimating the relevance factors may be accumulated from both stages, with errors from the first stage potentially being amplified by errors at the second stage.

In the single-step approach 255, a single composite or combined model 222 may be used, in which the position bias factors and the position-independent relevance metrics may be learned concurrently, e.g., using some variant of stochastic gradient descent in the depicted embodiment. The combined model 222 may of course have its own set of modeling errors 232. From a methodological standpoint, the single-step approach 255 may have the advantages, relative to the two-step approach 250, of avoiding the error amplification potentially caused by use two distinct models or modeling stages, and also of using fewer training resources in at least some embodiments.

Similarity Groups

Figure 3:
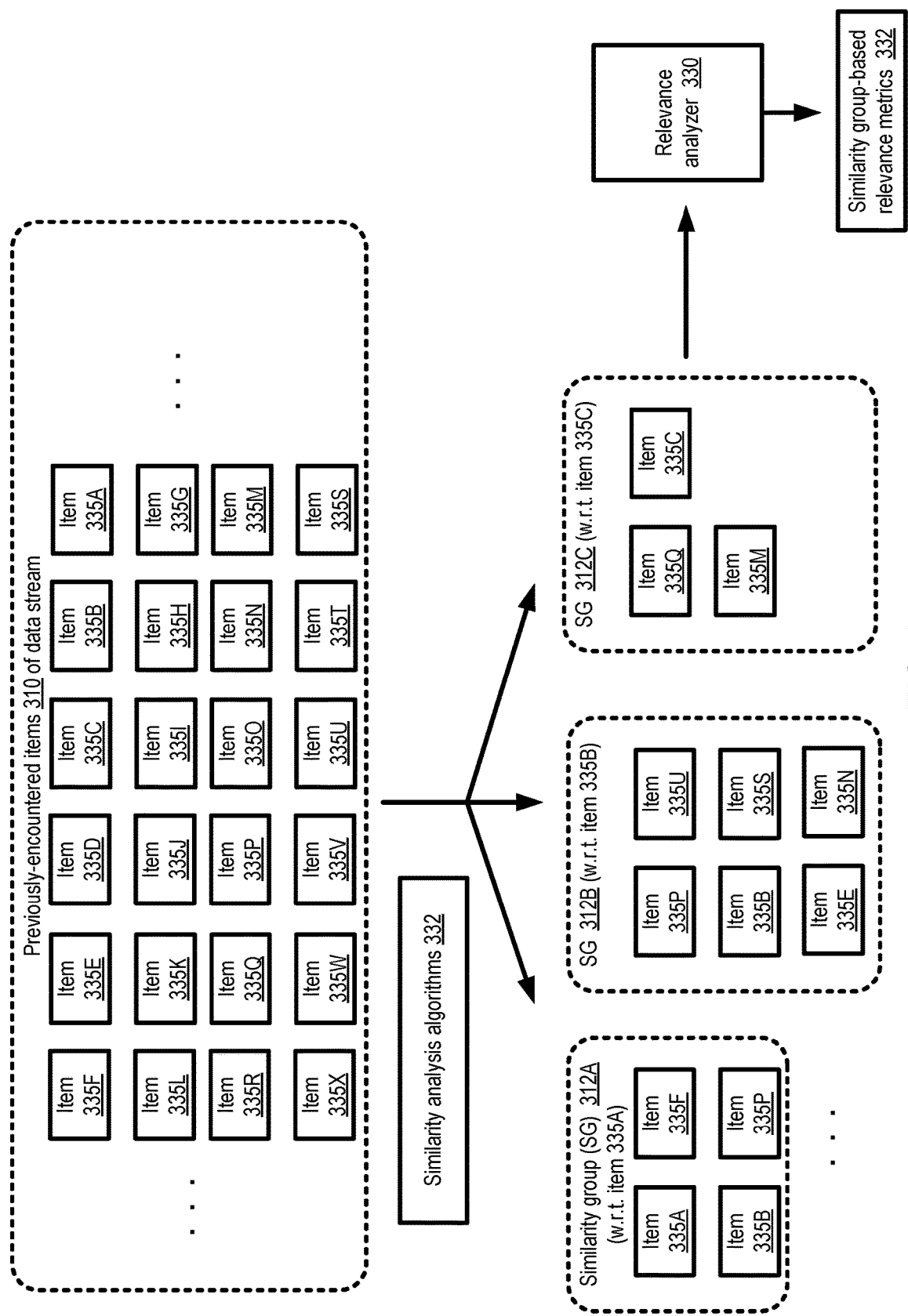
FIG. 3 illustrates an example use of similarity groups for relevance analysis of stream items, according to at least some embodiments.

FIG. 3 illustrates an example use of similarity groups for relevance analysis of stream items, according to at least some embodiments. In the depicted embodiment, a large number of items may have been encountered as part of a long-lived data stream during some selected time interval (such as a month or a week). Previously-encountered items 310 of the data stream may include items 335A-335X in the depicted embodiment. Various types of information may be available regarding stream items 335, individual ones of which may have been included within an ordered collection or list of items presented via one or more interactive interfaces at various points of time. In addition to records of interactions initiated by users (such as potential customers of an e-retail web site) with respect to the previously-encountered items, data about various attributes or features of the items may also be available.

In the depicted embodiment, with respect to at least some of the items 335, a respective similarity group of other items of the stream may be identified. For example, similarity group 312A may be identified with respect to item 335A, similarity group 312B may be identified with respect to item 335B, similarity group 312C may be identified with respect to item 335C, and so on. Similarity groups may also be referred to as substitute groups in some embodiments. Member items of a similarity group 312 may be identified, for example, by comparing the values of various attributes of pairs of items ($i_j$, $i_k$), assigning a similarity score to the pair of items, and then including $i_k$ in the similarity group of $i_j$ (and $i_j$ in the similarity group of $i_j$) if the similarity score exceeds a threshold. The similarity score may, for example, comprise a real value between 0 and 1, with 1 indicating that the two items are identical or near-identical, and 0 indicating that the two items are very different from one another. In some embodiments, a Jaccard similarity coefficient may be determined for a given pair of items and used as the similarity metric. As indicated in FIG. 3, a given item may be a member of multiple similarity groups in at least some embodiments—e.g., item 335P appears in similarity group 312A of item 335A, and also in similarity group 312B of item 335B. In the depicted embodiment, an item may be included in its own similarity group—e.g., item 335A appears in similarity group 312A, item 335B in similarity group 335B, and so on. As a result, a similarity group may have a minimum population of one item in such embodiments.

A variety of similarity estimation algorithms may be used in different items to identify similarity groups 312. In some embodiments, item attributes may be assigned respective weights indicating their semantic importance with respect to similarity detection—for example, a product category match may be consider much more significant than a price match, so a product category attribute may be assigned a higher weight than a price match. In other embodiments, attribute values may be compared without weights.

In some embodiments, a network-accessible service distinct from the relevance analysis service may be used to obtain similarity scores for various pairs or groups of products. Such a similarity detection service may, for example, take a larger set of attributes into account when determining similarity scores than may be available at the relevance analysis service, as discussed below in further detail. In other embodiments, the similarity groups 312 may be identified by the relevance analyzer 330 itself, and then used to generate predicted relevance scores according to one or both of the machine learning approaches discussed above.

Item Attributes

Figure 4:
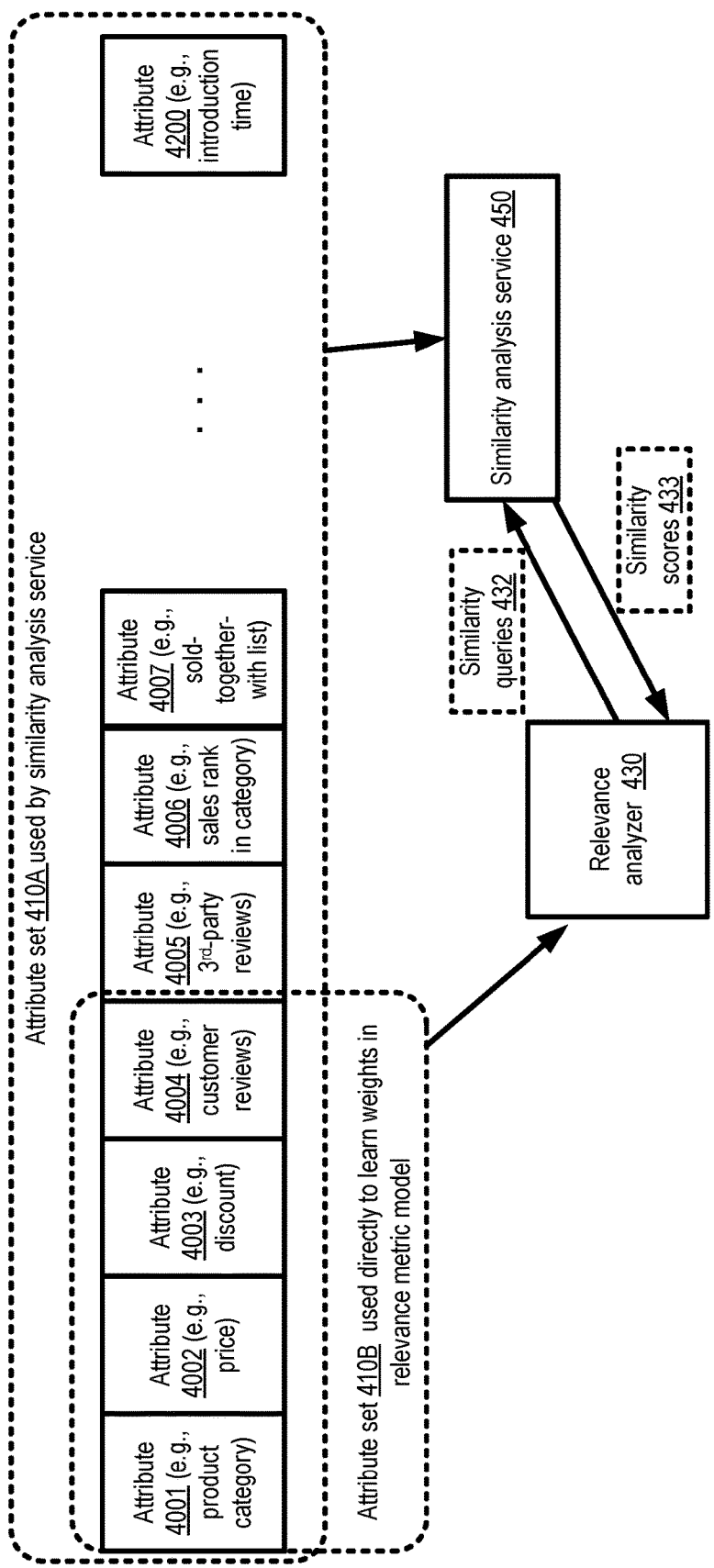
FIG. 4 illustrates examples of item attributes which may be used for similarity analysis and for estimating relevance metrics, according to at least some embodiments.

FIG. 4 illustrates examples of item attributes which may be used for similarity analysis and for estimating relevance metrics, according to at least some embodiments. In the depicted embodiment, respective values of a large number of attributes of the items of a data stream, e.g., attributes 4001-4020, may be stored in one or more repositories. Some subset of the attribute values may be accessible to a relevance analyzer 430 in the depicted embodiment, while a larger set of attributes may be available to a separate similarity analysis service 450.

Values of some subset of attributes, such as attribute set 410B (such as product category 4001, price 4002, discount 4003 and/or customer reviews 4004), may be used as part of the input for estimating or predict relevance factors using machine learning models such as the regression model and the combined model discussed above. A larger set of attributes, such as attribute set 410A comprising all available attributes, may be used for similarity score generation in the depicted embodiment by similarity analysis service 430. The larger set of attributes may, for example, include third-party reviews 4005, sales ranking information 4006 with respect to an inventory, a list of items that were sold together 4007, a timestamp 4200 indicating when the item was originally added to the inventory, and so on in the depicted embodiment. Geographical information, such as the breakdown of item sales by country, may also be included in set 410A in some embodiments. In at least some embodiments, the items of the data stream may also be included in other, longer-lived interactive interfaces, and information pertaining to the item may be collected from such other interfaces as well. For example, while the task of positioning a given item within a web page listing currently on-sale items may be accomplished using the relevance scores, that item may also be available for sale via other less transient portions of an e-retailer's web site, and information about interactions with the less transient portions may be included in the attribute set 410A used for similarity analysis in at least some embodiments.

In the embodiment depicted in FIG. 4, the relevance analyzer may submit similarity queries 432 regarding various pairs or groups of items to the similarity analysis service 450, and receive corresponding similarity scores 433 in response. In some embodiments, raw similarity scores may be obtained from the similarity analysis service, and similarity groups may be generated using the raw similarity scores at the relevance analyzer. In other embodiments, a similarity query 432 may request a similarity group for a specified item or a set of items, and the similarity group(s) may be identified at the similarity analysis service and provided to the relevance analyzer.

Interaction Records

Figure 5:
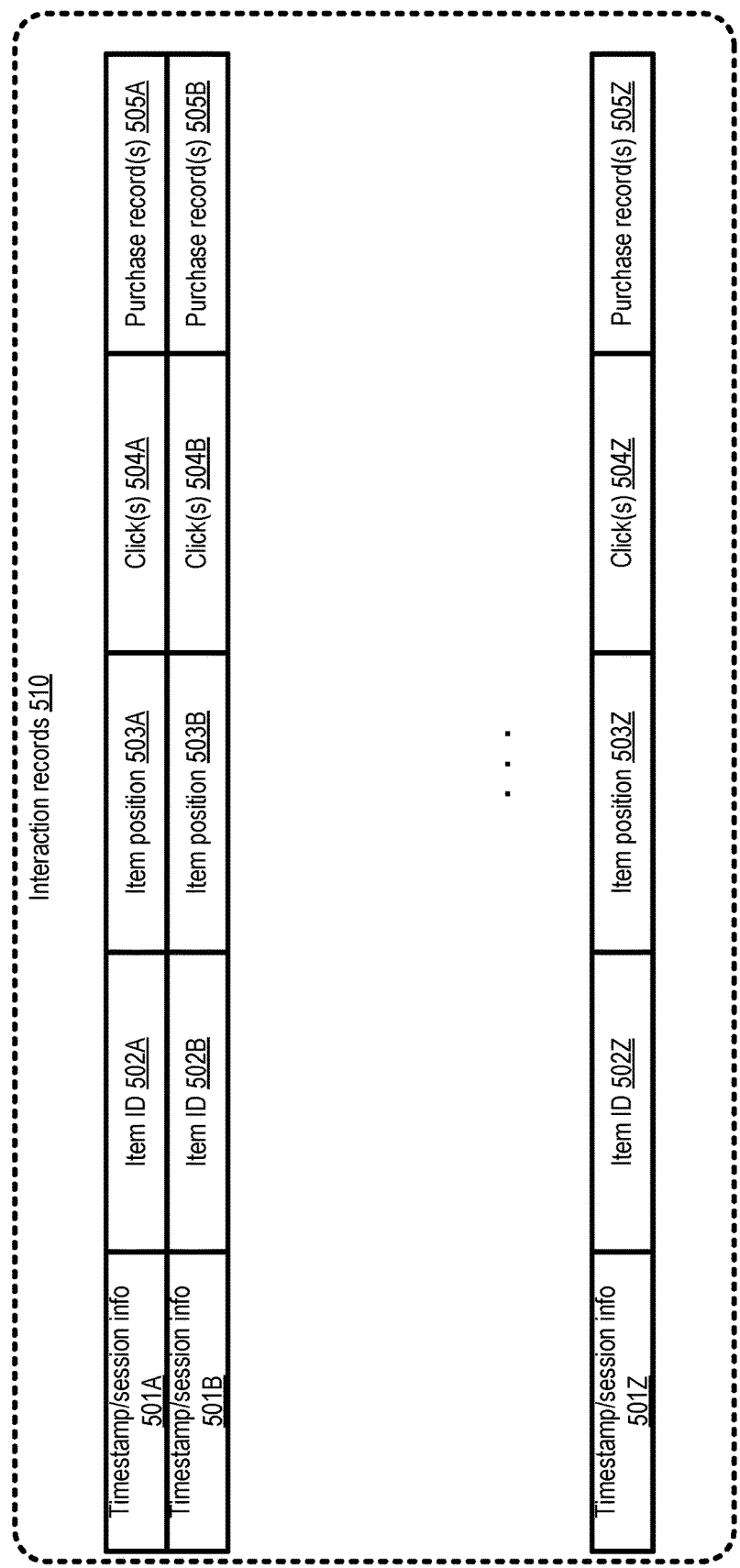
FIG. 5 illustrates example elements of interaction records which may be used for machine learning-based relevance analysis, according to at least some embodiments.

FIG. 5 illustrates example elements of interaction records which may be used for machine learning-based relevance analysis, according to at least some embodiments. In the depicted embodiment, interaction records 510 associated with items shown on a web page with clickable links may be stored and utilized for similarity group based item relevance analysis. A given interaction record may comprise respective fields for, among other types of data, session or timestamp information 501 (e.g., 501A-501Z), an identifier 502 of the item for which the record is generated (e.g., 502A-502Z), an indication of an item position 503 (e.g., 503A-503Z) within the interactive display being used during the session, an indication of the web link click(s) 504 initiated with respect to the item (e.g., 504A-504Z) and/or an indication of additional actions such as purchases 505 (e.g., 505A-505Z) which may have eventually resulted as a result of additional clicks starting with the initial web link clicks recorded in field 504.

In some embodiments, additional details such as a network address from which the session was initiated, a geographical location from which the session was initiated, and so on may also be recorded with respect to different item interactions and included in input for the machine learning models discussed earlier. In some embodiments, a representation of a given item may be included in more than one interactive interface—e.g., within a currently on-sale web page, a listing within an e-mail, and so on, and respective sets of interaction information may be collected with respect to each of the interfaces and used collectively for relevance analysis.

Example Programmatic Interactions

Figure 6:
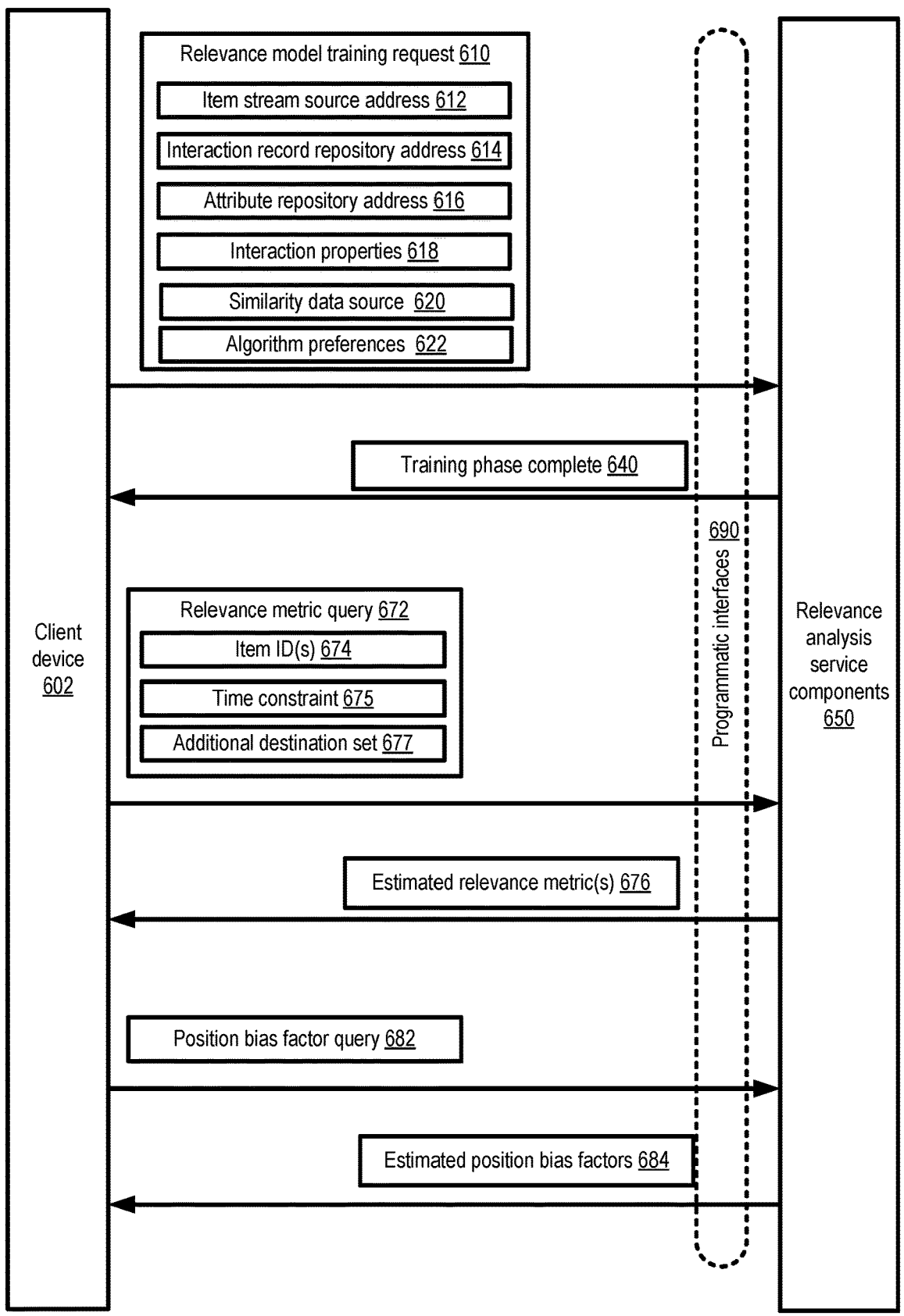
FIG. 6 illustrates example programmatic interactions of a client with a relevance analysis service, according to at least some embodiments.

FIG. 6 illustrates example programmatic interactions of a client with a relevance analysis service, according to at least some embodiments. In the embodiment depicted in FIG. 6, a relevance analyzer may implement one or more programmatic interfaces 690, such as a set of APIs, a web-based console, command line tools and/or a graphical user interface.

As shown, a relevance model training request 610 may be transmitted via a programmatic interface 690 from a client device (e.g., a desktop or laptop computer) to relevance analysis service components 650 in some embodiments.

Such a model training request 610 may, for example, include one or more parameters or elements such as respective indications of an item stream source address 612, an interaction record repository address 614, an attribute repository address 616, interaction properties 618, a similarity data source 620, and/or a set of algorithm preferences 622 in the depicted embodiment.

The item stream source address 612 may, for example, indicate a network address to which the relevance analysis service is to establish a connection to receive notifications regarding the streamed items. In at least some embodiments, a notification about an item of the stream may be received some time prior to the start of the time window in which the item is to be included in the interactive interface, thereby allowing the execution of the trained machine learning model(s) prior to the presentation of the item via the interface.

Interaction record repository address 614 and/or attribute repository address 616 may be provided to enable the relevance analysis service components 650 to obtain input data to be included in the training set for the machine learning models. In some embodiments, attribute information may be stored in the same repository as the interaction records, so separate addresses may not be required.

In various embodiments, interaction properties 618 may include, for example, information about the time period for which a given item is to be presented before it is removed from the targeted interactive interface, the number of items presented at a time via the interface, the arrangement of the items within the interface (e.g., whether items are presented as a list, a grid of icons and so on).

Similarity data source element 620 may indicate, for example, an address of a similarity analysis service from which similarity scores or similarity group member lists may be obtained in the depicted embodiment. In some embodiments, the relevance analysis service may itself be responsible for generating similarity scores and groups, or a separate similarity analysis service may not be accessible, in which case the similarity data source field 620 may be set to indicate that similarity computations are to be performed by the relevance analysis service.

In some embodiments, the requesting client may indicate a set of preferences 622 regarding the machine learning algorithms to be employed for relevance analysis. For example, the preferences 622 may indicate whether the two-step approach or the single-step approach is to be used, meta-parameters such as similarity thresholds to be used, and so on. In one embodiment, a client may indicate resource constraints with respect to training or executing the models—e.g., a client may have a limited budget of compute-minutes or compute-hours, and may indicate a targeted limit with respect to the usage of resources for training and/or executing the model(s).

In response to a relevance model training request 610, the relevance analysis components 650 may assemble the resources and input data needed to train the model(s) in the depicted embodiment. After the model or models have been trained, a message 640 indicating that the training phase is complete may be transmitted via the programmatic interfaces 690 to the client in some embodiments.

After the training completion notification is received, a client may submit at least two types of requests programmatically to the relevance analysis service in the depicted embodiment. In a relevance metric query 672, identifiers of one or more items 674 for which respective relevance metrics are to be predicted or estimated may be indicated in some embodiments, a time constraint 674 indicating a targeted time at which or by which the relevance metrics are to be provided by the service, and/or a set of additional destinations 677 to which the metrics are to be provided may be indicated. In the depicted embodiment, the estimated relevance metrics 676 may be provided by the service to the client and to the additional set of destinations 677 in response to the request 672. In some embodiments, instead of requesting individual relevance metrics, a client may simply submit a list of items to be ranked by relevance, and the service may provide a ranking for the items.

In at least one embodiment, the relevance analysis service may also provide the estimated position bias factors 684 for a given interface in response to programmatic queries 682 for the bias factors. The position bias factors may be used, for example, to redesign the layouts of the interactive interfaces in some embodiments. If the bias factors indicate, in one example scenario, that items positioned outside the first five items shown on a web page are likely to generate very few interactions, the web page may be redesigned to include only five items at a time, or rearranged in an attempt to generate more frequent clicks for more than five items.

It is noted that not all the elements shown in FIG. 6 may be included within programmatic requests submitted to the relevance analysis service in some embodiments. For example, in one embodiment, a client may leave many of the decisions, such as the types of algorithms to be used, and the like, to the components of the relevance analysis service. In at least one embodiment, values of some or all of the parameters may be indicated in one or more files or databases and the request 610 may indicate that the parameters should be read from the files or databases.

Provider Network Environment

Figure 7:
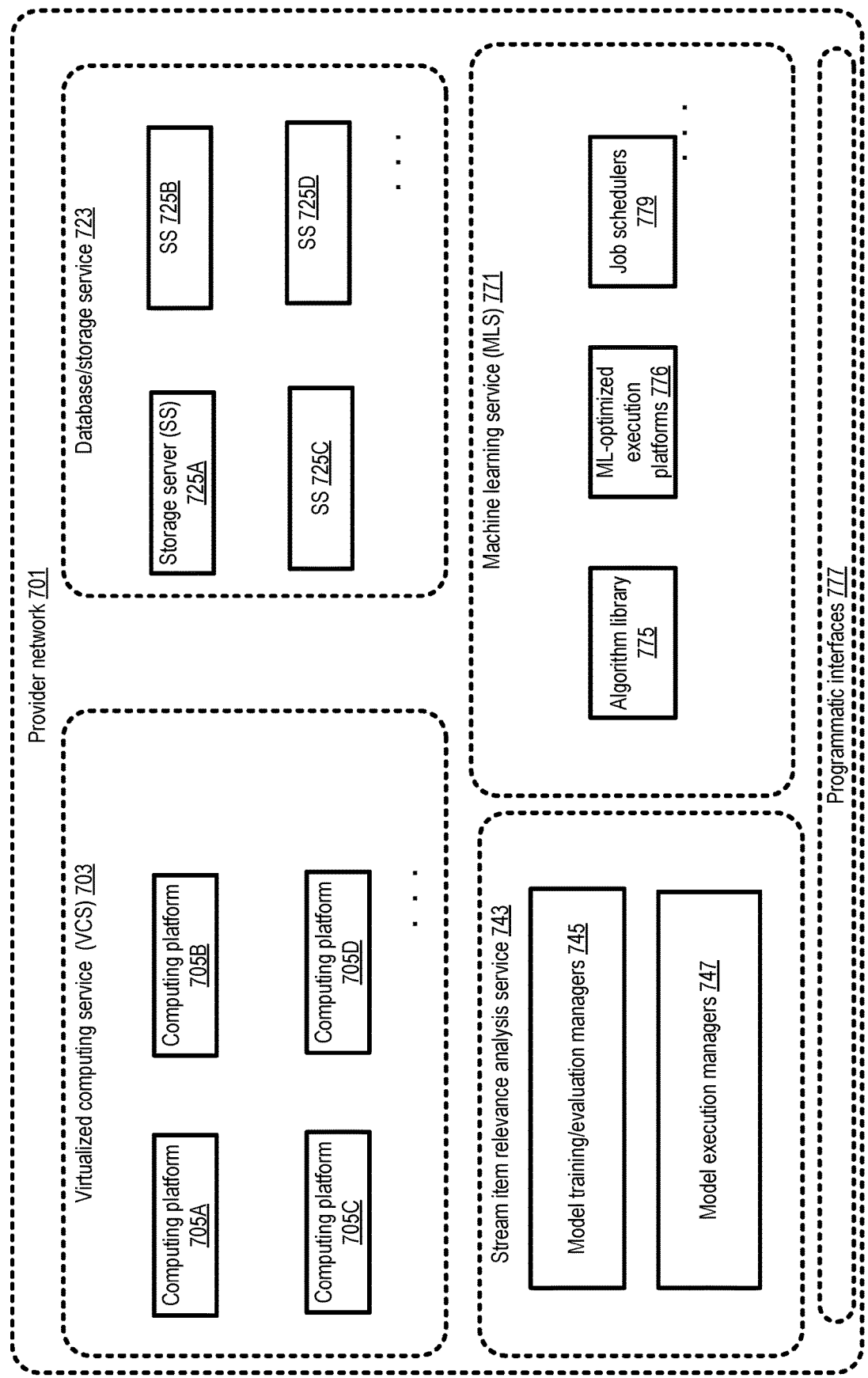
FIG. 7 illustrates an example provider network environment in which a relevance analysis service may be implemented, according to at least some embodiments.

FIG. 7 illustrates an example provider network environment in which a relevance analysis service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtual computing service 703, a database or storage service 723, a machine learning service 771 and a stream item relevance analysis service 743. Components of a given service may utilize components of other services in the depicted embodiment—e.g., for some machine learning tasks, a component of the machine learning service 771 may utilize virtual machines implemented at computing platforms such as 705A-705D of the virtualized computing service. Input data, intermediate results, final results and/or other artifacts of various machine learning algorithms or models may be stored at storage servers 725 (e.g., 725A-725D) of the database or storage service 723 in some embodiments. Individual ones of the services shown in FIG. 7 may implement a respective set of programmatic interfaces 777 which can be used by external and/or internal clients (where the internal clients may comprise components of other services) in the depicted embodiment.

As shown, the relevance analysis service 743 may comprise, among other components, one or more model training/evaluation managers 745 as well as one or more model execution managers 747 in the depicted embodiment. The training/evaluation managers 745 as well as the execution managers 747 may, for example, invoke algorithms selected from the machine learning algorithm library 775 to train the models to be used for relevance analysis. In some embodiments, requests to train machine learning models may be handled as batch jobs at the machine learning service, and a batch job scheduler 779 may orchestrate the allocation of resources for the jobs as well as dependencies among jobs. In at least one embodiment, a machine learning service 776 may have access to or include a set of execution platforms 776 that are optimized for machine learning tasks (e.g., platforms that have customized hardware such as GPU arrays and/or customized software stacks). Depending on the suitability of such platforms for relevance analysis, execution platforms 776 may be employed for the training and post-training execution of relevance analysis models in the depicted embodiment.

After the model or models to be used for relevance analysis with respect to a given item stream and/or a set of destination devices has been trained, the trained model may be executed at the request of a model execution manager 747 in the depicted embodiment to obtain relevance metrics for specific items. In at least some embodiments, the relevance analysis model training and execution may be accomplished using non-specialized computing platforms of the virtualized computing service. In various embodiments, the training and test/evaluation data used for relevance analysis models may be stored at a database/storage service 723.

As mentioned earlier, the techniques for relevance metric prediction/estimation described earlier may be implemented without acquiring resources of network-accessible services such as those shown in FIG. 7 in at least some embodiments. For example, a standalone relevance analyzer tool implemented at one or more computing devices which are not part of a network-accessible service may be used in some embodiments.

Example Devices for Item Presentation

Figure 8:
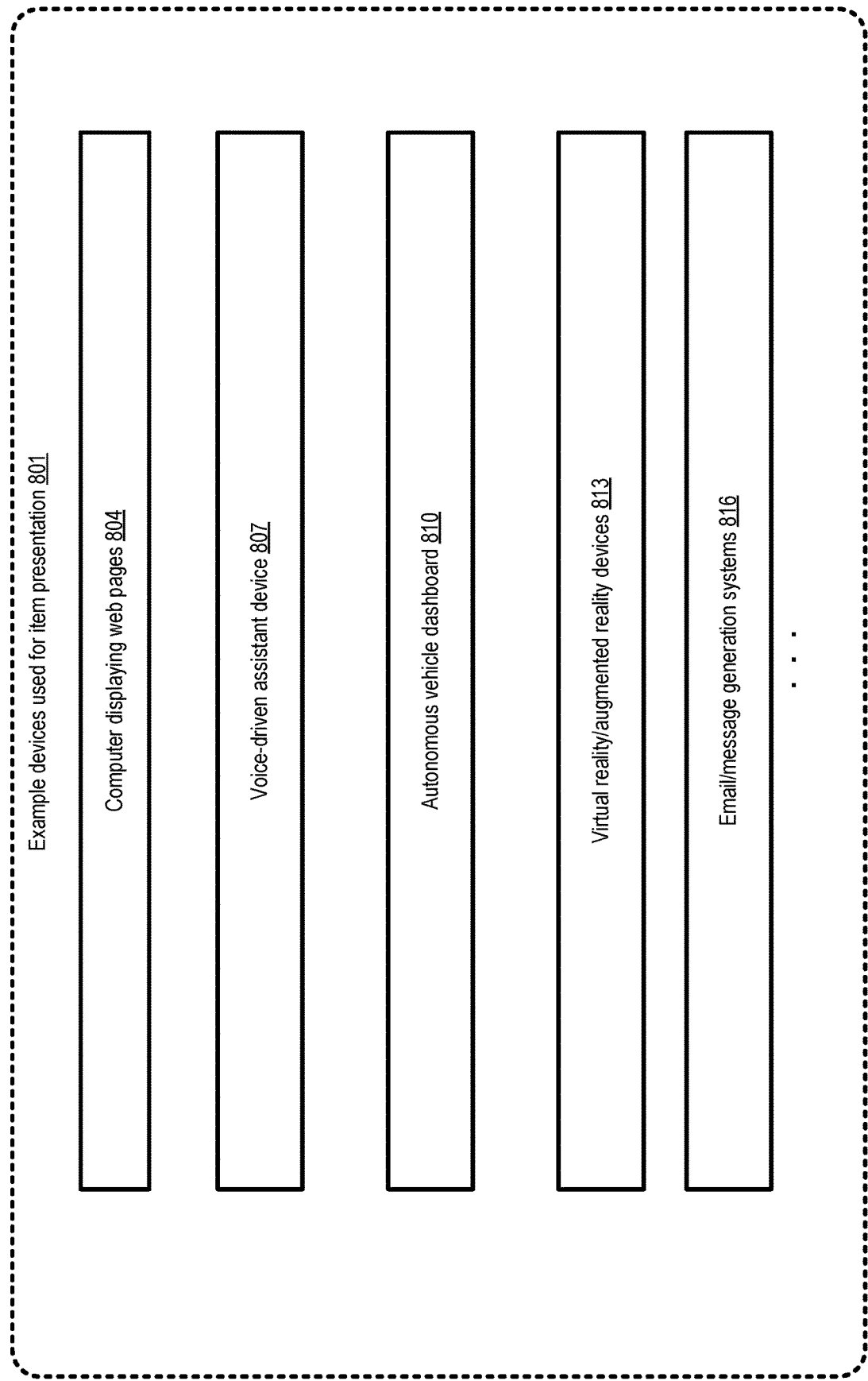
FIG. 8 illustrates example devices with interactive interfaces for which relevance analysis results may be used to arrange item information, according to at least some embodiments.

FIG. 8 illustrates example devices with interactive interfaces for which relevance analysis results may be used to arrange item information, according to at least some embodiments. In some embodiments, as indicated earlier, computer systems displaying web pages 804 with clickable links may represent one type of device at which relevance analysis metrics may be used for arranging items.

In one embodiment, relevance analysis may be used to propagate item information via a voice-driven assistant device 807. For example, a set of items (which may include physical products sold by a retailer, entertainment-related items such as songs or films) may be put on sale for some limited time period, and the voice-driven assistant device may present a list of such items in an order determined at least in part using relevance analysis. A customer or owner of the voice-driven device may respond to the list, for example, using an audio response, e.g., saying "I would like to buy that song" when a particular song title is listed. In some embodiments, the voice-controlled device may have a display incorporated within it, and such a display may be used for listing the items. The past interactions used to generate the relevance analysis need not necessarily have occurred on the same type of device as the device It which the results of the relevance analysis are used to arrange items in some embodiments—e.g., click-through rates at a web site may be used to arrange items that are voiced by the voice-driven assistant in some embodiments.

In some embodiments, lists of items may be arranged on a dashboard 810 or windscreen of an autonomous vehicle based on relevance analysis results. In one embodiment, relevance analysis results may be used to arrange items being presented via a virtual reality or augmented reality device 813. Generators 816 of emails or text messages which include lists of items may also utilize relevance metrics obtained from machine learning models of the kind discussed above in some embodiments. Other types of devices not shown in FIG. 8 may also utilize relevance metrics produced using machine learning in some embodiments.

Methods for Relevance Analysis

Figure 9:
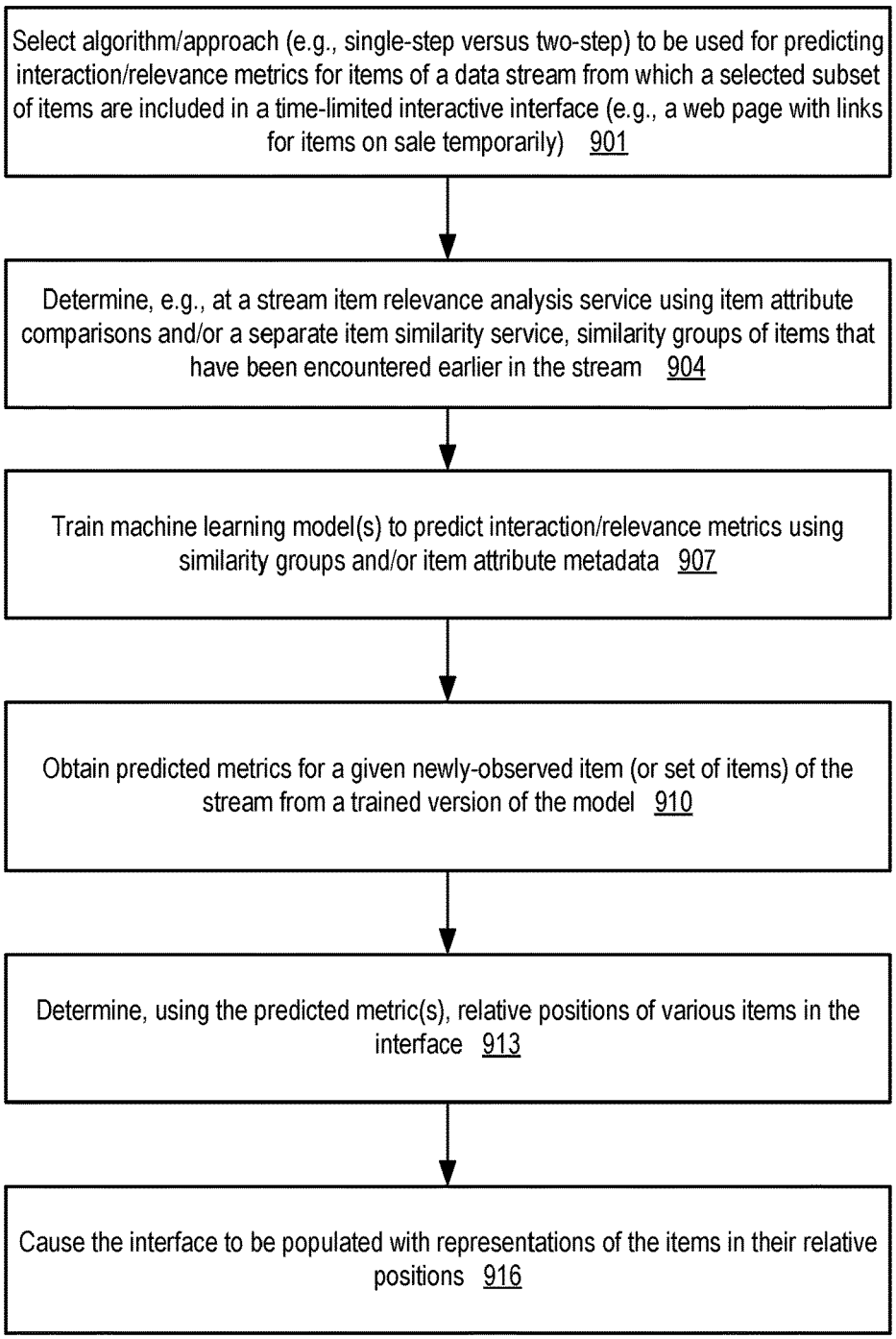
FIG. 9 is a flow diagram illustrating aspects of operations that may be performed to estimate relevance or interaction metrics for items of a data stream, according to at least some embodiments.

FIG. 9 is a flow diagram illustrating aspects of operations that may be performed to estimate relevance or interaction metrics for items of a data stream, according to at least some embodiments. As shown in element 901, an algorithm or approach (e.g., the single-step or two-step approach discussed in the context of FIG. 2) may be selected for predicting interaction/relevance metrics for items of a data stream from which a selected subset of items is presented via a time-limited interactive interface (e.g., a web page with links for items which are temporarily on sale).

Similarity groups among the items of the stream for which interaction records are available may be identified in the depicted embodiment (element 904), e.g., using attribute information regarding the items. In some cases the similarity groups may be identified at a relevance analysis service, while in other embodiments similarity metrics may be calculated at a separate similarity analysis service. In the latter scenario, it may sometimes be the case that the number of attributes for which values are available for similarity analysis may be larger than if the similarity analysis were performed at the relevance analysis service in some embodiments.

Using the similarity group membership information, associated interaction records and item attribute values as part of the training set, one or more machine learning models may be trained to estimate or predict relevance or interaction metrics (element 907) in the depicted embodiment. In some embodiments, a generative machine learning model may be trained to estimate position bias factors indicating the impact of item positioning within the interactive interface in a first stage of training, and a regression model may be trained to predict position-independent relevance metrics in a second stage. In other embodiments, a single combined model may be used to predict the positional bias factor and the relevance metric concurrently.

Predicted metrics for a given newly-observed item (or set of items) of the stream may be obtained from a trained version of the model(s) in the depicted embodiment (element 910). Using the metrics, relative positions of a set of items to be presented via an interactive interface may be determined or selected (element 913). The interface may then be caused to be populated with representations of the items of the set, arranged in the relative positions selected using the relevance metrics (element 916). New interactions may result from the inclusion of the items in the selected positions, and records of such interactions may be added to the historical records and used to retrain and enhance the models in some embodiments.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of identifying similarity groups among items that have been presented via interactive interfaces, and using the similarity groups and associated interaction records and item attribute values to generate relevance metrics such as click-through rates may be useful in a variety of scenarios. Many large e-retailing organizations may arrange short-term sales of various subsets of their inventories, with information about the currently on-sale items being provided on "deals" web pages or the like. Most items may not appear very often in such displays, and the amount of historical information available about the relative success or placing the items in various locations may be quite sparse. By identifying groups of similar items, and using historical information about the similar items to train machine learning models for predicting the relevance metrics, some of the problems associated with the sparse historical records may be alleviated. By using a single model to learn both positional bias factors and the position-independent relevance factors, the accumulation of modeling errors associated with two-step modeling efforts may be avoided. Using efficiently-generated relevance metrics, the positioning of stream items within interactive interfaces may be arranged in a data-driven manner so as to help maximize revenue from sales and other types of promotions.

Illustrative Computer System

Figure 10:
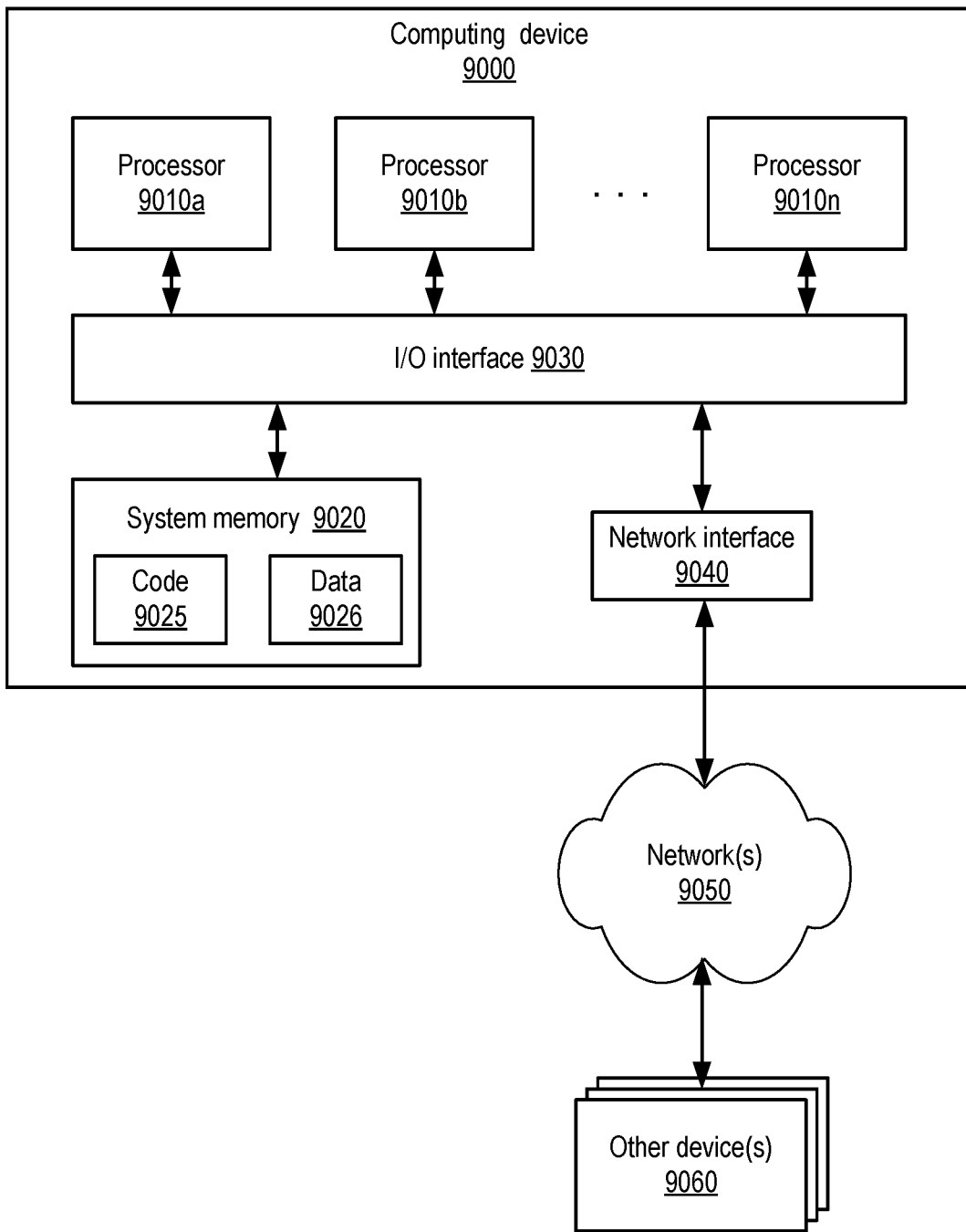
FIG. 10 is a block diagram illustrating an example computing device that may be used in at least some embodiments.

In at least some embodiments, a server that implements a portion or all of one or more of the technologies described herein, including the training and execution of machine learning models for item relevance analysis, the arrangement of items within various types of interactive interfaces, and so on, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for relevance analysis of items of data streams;
wherein the one or more computing devices are configured to:
identify a plurality of similarity groups of items in a data stream, wherein individual ones of the similarity groups comprise items of the data stream having attributes satisfying a similarity threshold, wherein the attributes are selected from a set of available attributes of the items in the data stream, wherein during a particular time interval representations of a subset of items of the stream are included in a programmatically generated display, wherein an interface associated with the display enables one or more types of interactions with respect to a displayed item, and wherein the one or more types of interactions include a click-through interaction with a web link corresponding to the displayed item;
train, using a first data set comprising identifications of the plurality of similarity groups and one or more records of interactions with items of the respective similarity groups, one or more machine learning models to predict at least (a) a first metric of a first targeted type of interaction with an item and (b) a position bias factor indicative of an impact of item positioning within the display on the one or more types of interactions;
obtain, from a trained version of at least one machine learning model of the one or more machine learning models, a predicted value of the first metric with respect to a new item of the data stream, wherein records of interactions with the new item were not included in the one or more records of interactions used to train the one or more machine learning models;
determine, based at least in part on the predicted value, a particular position at which the new item is to be included within the display; and
cause a representation of the new item to be displayed at the particular position during a selected time interval.

2. The system as recited in claim 1, wherein the one or more machine learning models comprise a combined model to learn, using a stochastic gradient descent algorithm, the position bias factor and the first metric concurrently.

3. The system as recited in claim 1, wherein the one or more machine learning models comprise one or more of (a) a generative machine learning model used to learn at least the position bias factor, or (b) a regression model used to learn at least the first metric.

4. The system as recited in claim 1, wherein the first data set comprises respective values of a first set of attributes of the first item, wherein the first set of attributes comprises one or more of: (a) a product category, (b) a price, (c) a discount, or (d) one or more customer reviews.

5. The system as recited in claim 1, wherein the one or more computing devices are configured to:
determine that a request indicating at least the data stream has been received via a programmatic interface of the artificial intelligence service, wherein the one or more models are trained in response to the request.

6. A method, comprising:
performing, by one or more computing devices:
obtaining an identification of a plurality of similarity groups of items in a data stream comprising a plurality of items, wherein individual ones of the similarity groups comprise items of the data stream having attributes satisfying a similarity, wherein the attributes are selected from a set of available attributes of the items in the data stream for respective ones of the similarity groups, wherein representations of a subset of items of the stream are included in a programmatically generated list, and wherein an interface associated with the list enables one or more types of interactions with respect to a listed item;
training, using a first data set comprising identifications of the plurality of similarity groups and one or more records of interactions with items of the respective similarity groups, one or more machine learning models to predict a relevance metric of an item, wherein the relevance metric is associated with at least a first type of interaction of the one or more types of interactions;
determining, using a trained version of at least one model of the one or more machine learning models, a predicted value of the relevance metric with respect to a new item of the data stream, wherein records of interactions with the new item were not included in the one or more records of interactions used to train the one or more machine learning models; and causing a representation of the new item to be included in a particular position within the list, wherein the particular position is selected based at least in part on the predicted value of the relevance metric.

7. The method as recited in claim 6, wherein the relevance metric comprises one or more of: (a) click-through rate of a web link corresponding to an item (b) a purchase rate of an item or (c) a revenue generation metric.

8. The method as recited in claim 6, wherein the first data set comprises respective values of a first set of attributes of the first item, wherein the first set of attributes comprises one or more of: (a) a product category, (b) a price, (c) a discount, or (d) one or more customer reviews.

9. The method as recited in claim 6, wherein said obtaining the identification of the similarity groups comprises querying a similarity analysis service, wherein to identify the similarity group, the similarity analysis service utilizes a plurality of attributes including an identification of co-selling of multiple items of an inventory.

10. The method as recited in claim 6, wherein in a first machine learning model of the one or more machine learning models, a distribution of a targeted type of interaction with an item in a given position within the list is modeled as a Poisson distribution.

11. The method as recited in claim 6, wherein a first machine learning model of the one or more machine learning models utilizes a stochastic gradient descent algorithm to learn a set of parameters for predicting a position-independent probability of a targeted type of interaction of the one or more types of interactions.

12. The method as recited in claim 6, wherein the programmatically generated list indicates a subset of items of an inventory which are on sale for at least a time period.

13. The method as recited in claim 6, further comprising performing, by the one or more computing devices:
    causing a voice-driven assistant device to generate audio output indicating one or more items of the list, including the new item.

14. The method as recited in claim 6, further comprising performing, by the one or more computing devices:
    in response to a programmatic request, providing an indication of a position bias factor determined using the one or more machine learning algorithms.

15. The method as recited in claim 6, wherein said obtaining an identification of the similarity groups of items comprises:
    obtaining values of a respective set of attributes of individual ones of the items of the data stream; and
    determining, using the values of the respective set of attributes, a similarity score with respect to at least some pairs of items of the data stream.

16. A non-transitory computer-accessible storage medium storing program instructions that when executed on one or more processors cause the one or more processors to:
    obtain an identification of a plurality of similarity groups of items in a data stream comprising a plurality of items, wherein individual ones of the similarity groups comprise items of the data stream having attributes satisfying a similarity threshold, wherein the attributes are selected from a set of available attributes of the items in the data stream for respective ones of the similarity groups, wherein representations of a subset of items of the stream are included in a programmatically generated ordered collection, and wherein an interface associated with the ordered collection enables one or more types of interactions with respect to an item of the collection;
    train, using a first data set comprising identifications of the plurality of similarity groups and one or more records of interactions with items of the respective similarity groups, one or more machine learning models to predict a relevance metric of an item, wherein the relevance metric is associated with at least a first type of interaction of the one or more types of interactions; and
    store a predicted value of the relevance metric with respect to a new item of the data stream, wherein the predicted value is obtained from a trained version of at least one machine learning model of the one or more machine learning models, wherein records of interactions with the new item were not included in the one or more records of interactions used to train the one or more machine learning models.

17. The non-transitory computer-accessible storage medium as recited in claim 16, wherein the program instructions when executed on one or more processors cause the one or more processors to:
    store an estimate of a position bias factor obtained from the one or more machine learning models, wherein the position bias factor indicates an impact of positioning of an item within the ordered collection.

18. The non-transitory computer-accessible storage medium as recited in claim 16, wherein the relevance metric comprises one or more of: (a) click-through rate of a web link corresponding to an item (b) a purchase rate of an item or (c) a revenue generation metric.

19. The non-transitory computer-accessible storage medium as recited in claim 16, wherein the first data set comprises respective values of a first set of attributes of the first item, wherein the first set of attributes comprises one or more of: (a) a product category, (b) a price, (c) a discount, or (d) one or more customer reviews.

20. The non-transitory computer-accessible storage medium as recited in claim 16, wherein the program instructions when executed on one or more processors cause the one or more processors to:
    cause a representation of an arrangement in which a particular subset of items of the first data stream is to be presented to be transmitted to a destination device, wherein the arrangement is based at least in part on the predicted value of the relevance metric, wherein the particular subset of items includes the new item, and wherein the destination device comprises one or more of: (a) a smart phone, (b) a tablet computing device, (c) a voice-activated assistant device, (d) a virtual reality device, (e) an augmented reality device, (f) a computing device installed in a vehicle, (g) a laptop computer, or (h) a desktop computer.

* * * * *